United States Patent
Geissler (10) Patent No.: US 11,949,982 B2
(45) Date of Patent: Apr. 2, 2024

(54) METHOD OF FORMING A PROCESSED VIDEO STREAM

(71) Applicant: MO-SYS ENGINEERING LIMITED, London (GB)

(72) Inventor: Michael Paul Alexander Geissler, London (GB)

(73) Assignee: MO-SYS ENGINEERING LIMITED, London (GB)

(*) Notice: Subject to any disclaimer, the term of this patent is extended or adjusted under 35 U.S.C. 154(b) by 76 days.

(21) Appl. No.: 17/423,614

(22) PCT Filed: Jan. 17, 2020

(86) PCT No.: PCT/GB2020/050098
§ 371 (c)(1),
(2) Date: Jul. 16, 2021

(87) PCT Pub. No.: WO2020/148549
PCT Pub. Date: Jul. 23, 2020

(65) Prior Publication Data
US 2022/0109788 A1    Apr. 7, 2022

(30) Foreign Application Priority Data
Jan. 17, 2019 (GB) ..................... 1900655

(51) Int. Cl.
*H04N 23/661* (2023.01)
*G06T 5/00* (2006.01)
(Continued)

(52) U.S. Cl.
CPC ........... *H04N 23/661* (2023.01); *G06T 5/002* (2013.01); *G06T 5/003* (2013.01); *G06T 5/006* (2013.01);
(Continued)

(58) Field of Classification Search
CPC .... H04N 23/661; H04N 5/2628; H04N 23/61; H04N 23/69; H04N 23/695; H04N 23/80;
(Continued)

(56) References Cited

U.S. PATENT DOCUMENTS

| | | |
|---|---|---|
| 2004/0178988 A1 | 9/2004 | Titcomb et al. |
| 2006/0038890 A1 | 2/2006 | MacIntosh et al. |

(Continued)

FOREIGN PATENT DOCUMENTS

| | | |
|---|---|---|
| CN | 107027007 A | 8/2017 |
| CN | 109064489 A | 12/2018 |

(Continued)

OTHER PUBLICATIONS

International Search Report and Written Opinion for PCT/GB2020/050098 dated Apr. 20, 2020.

(Continued)

*Primary Examiner* — Christopher K Peterson
(74) *Attorney, Agent, or Firm* — Haynes and Boone, LLP (57) ABSTRACT

A method for forming a processed video stream, comprising: capturing a first part of an input video stream using a camera; transmitting the first part of the video stream to a processing facility remote from the camera; at the processing facility, designating a first sub-region of the first part of the video stream for further processing; in dependence on the designation of a first sub-region, forming a first cropped video stream by cropping the first part of the video stream to that sub-region; forming the processed video stream incorporating the first cropped video stream.

19 Claims, 3 Drawing Sheets

(51) Int. Cl.
*H04N 5/262* (2006.01)
*H04N 23/61* (2023.01)
*H04N 23/69* (2023.01)
*H04N 23/695* (2023.01)
*H04N 23/80* (2023.01)

(52) U.S. Cl.
CPC ........... *H04N 5/2628* (2013.01); *H04N 23/61* (2023.01); *H04N 23/69* (2023.01); *H04N 23/695* (2023.01); *H04N 23/80* (2023.01); *G06T 2207/10016* (2013.01); *G06T 2207/20201* (2013.01)

(58) Field of Classification Search
CPC ....... H04N 21/440245; H04N 21/4728; H04N 21/854; H04N 21/2187; H04N 21/234345; H04N 23/662; H04N 23/62; H04N 23/631; G06T 5/002; G06T 5/003; G06T 5/006; G06T 2207/10016; G06T 2207/20201; G08B 13/19689
See application file for complete search history.

(56) References Cited

U.S. PATENT DOCUMENTS

| | | |
|---|---|---|
| 2007/0120979 A1 | 5/2007 | Zhang et al. |
| 2007/0280345 A1 | 12/2007 | Tu et al. |
| 2012/0314077 A1 | 12/2012 | Clavenna et al. |
| 2014/0245367 A1 | 8/2014 | Sasaki et al. |
| 2016/0105617 A1 | 4/2016 | Kirkby et al. |
| 2016/0112757 A1 | 4/2016 | Pan et al. |
| 2017/0125064 A1* | 5/2017 | Aggarwal ............... H04N 23/69 |
| 2018/0249047 A1 | 8/2018 | Marlatt |
| 2019/0053857 A1* | 2/2019 | Sugie ....................... A61B 1/00 |

FOREIGN PATENT DOCUMENTS

| | | |
|---|---|---|
| EP | 3355587 A1 | 8/2018 |
| GB | 2512628 A | 10/2014 |
| KR | 20090006281 A | 1/2009 |
| WO | 2016190994 A1 | 12/2016 |
| WO | 2020148549 A1 | 7/2020 |

OTHER PUBLICATIONS

Bashir et al., "Collaborative Tracking of Objects in EPTZ Cameras," Visual Communication and Image Processing, Jan. 30, 2007, 10 pages.
Office Action for Application No. GB1900655.0 dated Jul. 9, 2019.
Office Action for Application No. GB1900655.0 dated May 13, 2020.
Office Action for Application No. GB1900655.0 dated May 18, 2020.

* cited by examiner

METHOD OF FORMING A PROCESSED VIDEO STREAM

RELATED APPLICATIONS

This application is a 371 National Stage of International Patent Application No. PCT/GB2020/050098 filed 17 Jan. 2020, entitled "CAMERA CONTROL," which claims priority to British Patent Application No. 1900655.0 filed 17 Jan. 2019, entitled "Camera control," both of which are herein incorporated by reference in their entirety.

This invention relates to remotely controlling a camera.

Cameras for capturing video from live events, such as sports events, are conventionally mounted on heads that allow the cameras to be tilted and panned. Tilting involves rotating the camera about a generally horizontal axis so that the camera's field of view is raised or lowered. Panning involves rotating the camera about a generally vertical axis so that the camera's field of view is moved from side to side. Such cameras are conventionally fitted with variable zoom lenses. By adjusting the zoom of the lens, the camera's field of view can be narrowed or widened. As an object of interest moves in front of the camera, it is desirable to control the camera's pan, tilt and zoom so as to capture the best view of the object. Normally, this is done by an operator located next to the camera.

A camera can be provided with a motorised head which allows its pan and tilt to be controlled remotely. Similarly, a camera may be provided with a motorised zoom lens, which allows the camera's zoom to be controlled remotely. In principle, equipment of this type could avoid the need for an operator at the camera's location. This could save significant travel cost when the camera is at a distant location from a filming company's base, and it could allow the camera to be positioned in locations (e.g. at a motor racing circuit) that are too dangerous for a person to occupy. With this in mind, an efficient way for a filming company to capture video of a live event at a remote location might be to ship a number of remotely controllable cameras to the location, to arrange for video feeds from that location to the company's central production facility, and for the cameras to be controlled remotely from the central facility. However, a problem with this arrangement can be that the time delay for signals between the central facility and the remote location is too long to allow the remote cameras to be controlled effectively. There is a first delay in the video feed being transmitted between the cameras and the production facility. Once an operator has viewed that feed and generated a control signal to a camera there is a second delay in that signal reaching the camera. If the camera is filming a fast-moving subject such as a downhill skier or a racing car, the total delay can result in a failure to react fast enough to movement of the subject, and the subject can be lost from the camera's field of view. This results in poor video footage. Also, once the subject has been lost from the camera's field of view if the camera is being controlled remotely it can be difficult for the camera operator to regain the subject because the operator is not able to see the subject directly.

There is a need for an improved way of controlling a camera remotely.

According to one aspect there is provided a method for forming a processed video stream, comprising: capturing a first part of an input video stream using a camera; transmitting the first part of the video stream to a processing facility remote from the camera; at the processing facility, designating a first sub-region of the first part of the video stream for further processing; in dependence on the designation of a first sub-region, forming a first cropped video stream by cropping the first part of the video stream to that sub-region; forming the processed video stream incorporating the first cropped video stream.

According to a second aspect there is provided a method for forming a processed video stream, comprising: receiving a first part of an input video stream captured using a camera at a processing facility; at the processing facility, designating a first sub-region of the first part of the video stream for further processing; in dependence on the designation of a first sub-region: (i) forming a first cropped video stream by cropping the first part of the video stream to that sub-region and (ii) forming a camera control signal; forming the processed video stream incorporating the first cropped video stream; and transmitting the camera control signal to the camera for adjusting the field of view of the camera.

According to a third aspect there is provided a system for forming a processed video stream, comprising: an input for receiving an input video stream; a user interface configured to enable a user to designate a sub-region of the input video stream and to output a region signal indicating that region; a video processor configured to crop the video stream in dependence on the region signal to form a processed video stream; and a camera controller configured to form a control signal for a camera in dependence on the region signal so as to cause a camera capturing the input video stream to adapt its field of view towards that corresponding to the designated region.

According to a fourth aspect there is provided a simulated camera system comprising: an input for receiving a video stream at a relatively high quality; a simulated camera unit having a user control interface which mimics the control interface of a video camera motion system, a plurality of sensors for sensing the state of the user control interface and a video display; and a processor configured to crop the video stream in dependence on the state of the sensors, thereby forming a cropped video stream, and to cause the video display to display the cropped video stream.

The first cropped video stream may formed so as to comprise substantially only those regions of the first part of the video stream to the sub-region.

The step of designating the first sub-region may be performed contemporaneously with the step of capturing the input video stream.

The processed video stream may be a live broadcast stream depicting a live event.

The step of capturing the input video stream may comprise capturing a video stream of a live event.

The camera may be adjustable to alter its field of view. The method may comprise in dependence on the designation of a first sub-region, forming a camera control signal; and adjusting the field of view of the camera in dependence on the camera control signal.

After the step of adjusting the field of view of the camera, a second part of the input video stream may be captured using the camera; the second part of the input video stream may be transmitted to the processing facility; at the processing facility, a second sub-region of the second part of the input video stream may be designated for further processing; and in dependence on the designation of a second sub-region: (i) a second cropped video stream may be formed by cropping the second part of the video stream to that sub-region; and the processed video stream may be formed incorporating the second cropped video stream.

The camera control signal may be transmitted to a camera installation comprising the camera; the camera installation being configured to automatically adjust the field of view of the camera in dependence on the camera control signal.

The step of forming the camera control signal may comprise automatically analysing the position and/or size of the first sub-region with respect to the entire field of the first part of the input video stream, and there may be automatically applied a predetermined algorithm in dependence on that determination to form the camera control signal.

The camera control signal may be such as to cause the field of view of the camera to alter so as to bring a location in the first part of the input video stream at the centre of the first sub-region closer to the centre of the field of view of the camera.

The method may further comprise the step of adjusting, in an inverse manner to the camera control signal, the position of the first sub-region within the field of view of the camera, such that the field of view within the first sub-region remains the same.

The method may further comprise the step of recognising a delay between the designation of the first sub region and the movement of the camera in response to the camera control signal.

The method may further comprise the step of recognising a delay between the designation of the first sub region and the receipt of images generated after movement of the camera in response to the camera control signal.

The inverse adjusting of the position of the first sub-region within the video stream may be dependent upon the recognised delay.

The method may further comprise the step of adjusting the display at the processing facility of images from the camera, based on the recognised delay, such that the first sub region moves closer to the centre of the video stream.

The method may further comprise the step of identifying when individual image frames were captured so as to permit the determination of whether a given frame was captured whilst the camera was in motion or stationary.

The method may further comprise the step of introducing motion blur into one or more frames in the first cropped video stream that were captured whilst the remote camera was stationary, but after a camera movement control signal had been generated.

The method may further comprise the step of removing image motion blur from one or more frames in the first cropped video stream that were captured whilst the remote camera was moving, but after the camera control signal had indicated the camera should be stationary.

The method may further comprise the step of compensating for distortion and/or vignetting caused by the centre of the first sub region not being aligned with the centre of the field of view of the camera.

The step of adjusting the camera may comprise adjusting the pan or tilt of the camera, or translating the camera.

The camera control signal may be such as to cause the field of view of the camera to alter so as to bring a region in the first part of the input video stream of the size of the first sub-region closer in size to a predetermined target size.

The step of adjusting the camera may comprise adjusting the zoom of the camera.

The responsiveness of the camera to a previous camera control signal may be estimated; and the camera control signal may be formed in dependence on that estimated responsiveness.

The step of designating a first sub-region of the first part of the video stream for further processing may be performed by a human designating the first sub-region. The system may accept human input indicating that designation, The boundary of the first sub-region may be displayed on a display.

A first sub-region of the first part of the video stream may be designated for further processing by automatically analysing the first part of the video stream to identify a subject of interest therein, and designating the first sub-region so as to encompass that subject.

The processed video stream may have lower resolution than the input video stream.

According to another aspect there is provided use, for the purpose of mitigating communication delay between the camera and the production facility, of a method as set out above.

According to another aspect there is provided use, for the purpose of mitigating communication delay between the camera and a production facility comprising the user interface, of a system as set out above.

The processor may be configured to crop the video stream so as to provide a user of the simulated camera unit the sensation of operating a camera that is capturing the cropped video stream.

The present invention will now be described by way of example with reference to the accompanying drawings. In the drawings.

Figure 1:
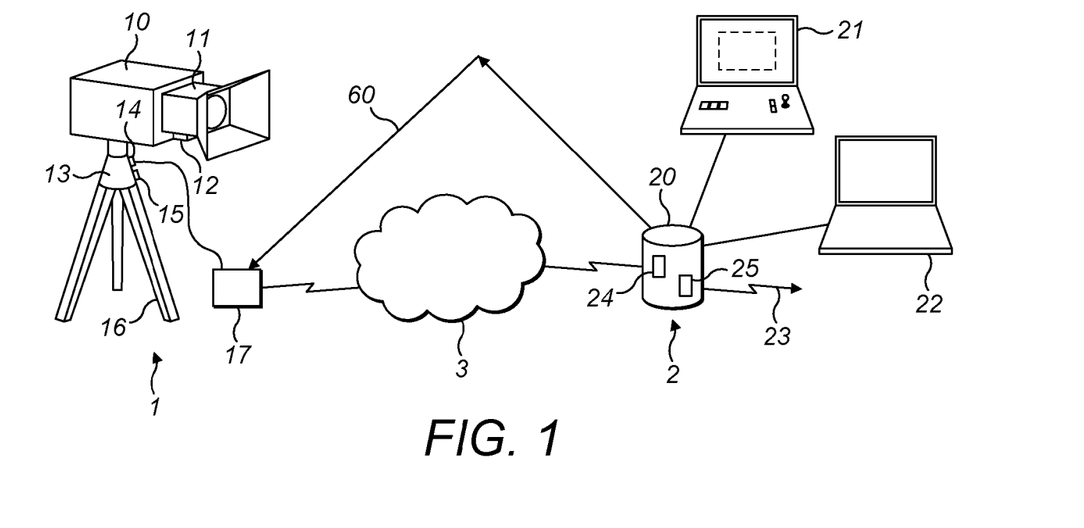
FIG. 1 shows a camera installation and a production facility.

FIG. 1 shows a camera installation indicated generally at 1 and a production facility shown generally at 2. The production facility is remote from the camera installation. The two are connected by a communications network shown at 3. That may be a publicly accessible network such as the internet. In practice, the camera installation may be at the site of a live event, such as a sports event, an arts performance or a news event. That may be taking place many miles or even thousands of miles from the production facility.

The camera installation comprises a camera 10. The camera is capable of capturing video. The camera has a variable zoom lens 11, which is provided with a motor 12 by which the zoom of the lens can be altered. The camera is mounted on a pan and tilt head 13. The pan and tilt head allows the direction in which the camera is pointing to be adjusted. The pan and tilt head is provided with motors 14, 15 for adjusting its pan and tilt. The camera could be mounted on motion devices of other types, for example a guide track, an articulated support arm or a drone. Such a motion device may be capable of translating the camera in one or more axes. For example, it may be capable of translating the camera in a first axis that is horizontal or has a horizontal component and/or a second axis that is vertical or has a vertical component. The first axis may be orthogonal to the second axis. In each case, the motion device is capable of adjusting the position of the camera and thereby adjust the camera's view. In each case, the motion device can be operated by one or more motors, linear actuators, hydraulic actuators, pneumatic actuators, propellers or the like to adjust the position of the camera. The camera is mounted on a tripod 16 or any other suitable mounting mechanism.

The camera is coupled by a communications cable or a wireless data link to a local camera controller 17. The local camera controller receives a video signal from the camera and transmits it to the production facility 2. The camera controller also receives from the production facility movement control signals for controlling the movement of the camera and zoom signals for controlling the zoom of the camera and it transmits those signals to the appropriate motors or other motion units to control the operation of the camera. The local camera controller acts as a communications interface between the network 3 and the camera. The local camera controller is coupled to network 2 by a cable (e.g. an ethernet cable) or a wireless link (e.g. a cellular data link). The camera controller could be integrated with the camera or could be a separate unit.

The production facility 2 comprises a production control unit 20, an image subset control terminal 21 and a production control terminal 22. The production control unit manages the video feeds received from the camera 10 and potentially other cameras and generates control signal to the camera(s). The image subset control terminal 21 allows a user to select a portion of an image received from a camera. The production terminal 22 allows a user to combine video feeds received from multiple cameras, computer-generated sources and stored video data to form a video output stream at 23.

The production control unit is coupled to the network 3 for receiving video from camera 10 and potentially also from other cameras. The production control unit comprises a processor 24 and a memory 25. The memory stores in non-transient form program code executable by the processor to cause it to perform the functions of the production control unit as described herein. The production control unit is also coupled to the terminals 21, 22.

Figure 2:
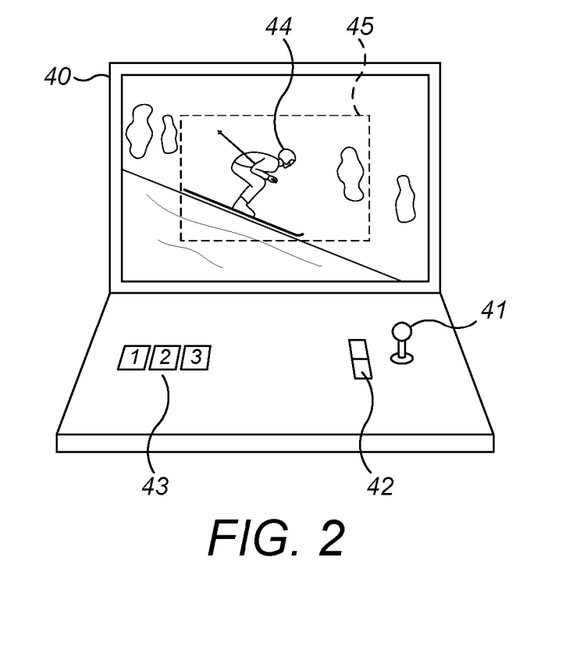
FIG. 2 shows a control station.

The image subset control terminal 21 is shown in more detail in FIG. 2. It comprises a display 40, a position user interface input 41, a zoom user interface input 42 and a camera selection user interface input 43.

An important function of the terminal 21 is to allow a user of the terminal to select a sub-region of a video stream generated by a camera. The camera may generate a video stream at a higher resolution than is required for the output stream at 23. Thus the number of pixels in the height and/or the width of the image captured by the camera may be more than the number of pixels in the respective dimension of the image as conveyed in the output stream. As an example, the camera may generate video at 4K resolution (3840×2160 pixels or 4096×2160 pixels) whereas the resolution required for the output stream may be 1080i resolution (1920×1080 pixels). To form the output stream, video from the camera may be downscaled and/or cropped. In one example, the entire field of view of the camera's video stream may be downscaled to the output resolution. In another example, a portion of the camera's video stream that has the same resolution as the output stream may be cropped from the camera stream. In another example a portion of the camera's video stream that is smaller than the entire field of view of the camera's video stream but greater than the output video stream may be both cropped from the camera stream and downscaled.

FIG. 2 shows the terminal 21 displaying a frame of a video stream received from a camera. The video stream is transmitted to the controller 20, as described above, and from the controller to the terminal 21. The camera video stream includes a subject 44, which in this case is a skier. The display 40 of the terminal 21 shows a boundary box 45. The boundary box 45 delineates the sub-region of the camera video stream that is to be selected for potential inclusion in the output video stream. The boundary box has the same proportions, e.g. pixel height to width ratio, as the output stream. A user of the terminal can change the size of the boundary box, by scaling it larger or smaller relative to the boundary of the camera stream, using the zoom input 42. The user can change the position of the boundary box, by moving it left, right, up or down relative to the boundary of the camera stream, using the position input 41. In this way the user can select a sub-region of the camera stream by delineating it with the boundary box. The portion of the camera image within the boundary box is considered to be selected.

In FIG. 2 the boundary box is indicated by an outline. The region designated by the boundary could be indicated in other ways, for example by a highlighted region of the display (e.g. as a region having greater brightness or contrast than the remainder of the display, or having a coloured cast).

Once a user of terminal 21 has designated a boundary box for the time being on a video stream from a camera, the terminal 21 transmits the size and location of that boundary box to the control unit 20. This may conveniently be done by transmitting the pixel locations of two opposite corners of the boundary box in the camera stream, or in any other suitable way. The control unit 20 then processes that camera stream to downscale and/or crop it to form an intermediate video stream that represents only that portion of the camera stream that is bounded by the boundary box, and has the resolution of the intended output stream. For example, if the camera stream has a resolution of 4096×2160 and the output stream has a resolution of 1920×1080 and the pixel locations relative to the camera stream of two opposite corners of the currently designated boundary box are [400,900] and [2511, 2087] then the control unit 20 forms the intermediate stream by cropping the camera stream to the rectangular 2112×1188 window having [400,900] as one corner, and then downscaling that rectangle to 1920×1080. It is possible for the selected rectangle to be upscaled rather than downscaled, although that would result in an output image of reduced quality. That intermediate image may form the output stream. Alternatively, the output stream may be formed from one or more selected intermediate streams, as described below.

In practice, there may be multiple cameras at a filming location, and their streams together with other video feeds such as computer generated imagery and overlays may need to be combined and alternated to form the output video stream. When there are multiple cameras 10 at a remote location, there may conveniently be one terminal 21 for each such camera. Then the boundary of the desired region of video can be conveniently designated in real time for each camera, and a respective intermediate stream formed accordingly. Alternatively, one terminal could be used to designate the regions of interest for multiple streams simultaneously. The region of interest for a stream could be designated manually, as described above, or automatically by image recognition software which could be configured to designate a region having predetermined characteristics such as relatively high contrast or an appearance that resembles a predetermined object such as a person.

Terminal 22 provides a user interface which receives the available video (preferably the intermediate streams) and other inputs, and allows a user to select which ones are to be used to form the output image. For example, terminal 22 allows a user to switch between different camera or intermediate feeds as a subject moves from the field of view of one camera to another. The controller 20 provides the available video (preferably the intermediate streams) and other inputs to the terminal 22. A user of terminal 22 indicates by means of a user input device (e.g. a keyboard, touchscreen or pointing device) at the terminal 22 which one(s) of the available content is/are to form the output stream. That indication is sent to the control unit 21. The control unit 21 then forms the output stream at 23 by selecting the appropriate content.

One or both of the terminals 21, 22 may be implemented automatically, using an algorithm to select a desired portion of a video stream, or to select a desired content stream. In that case the terminals may be integrated with the controller 20.

Figure 3:
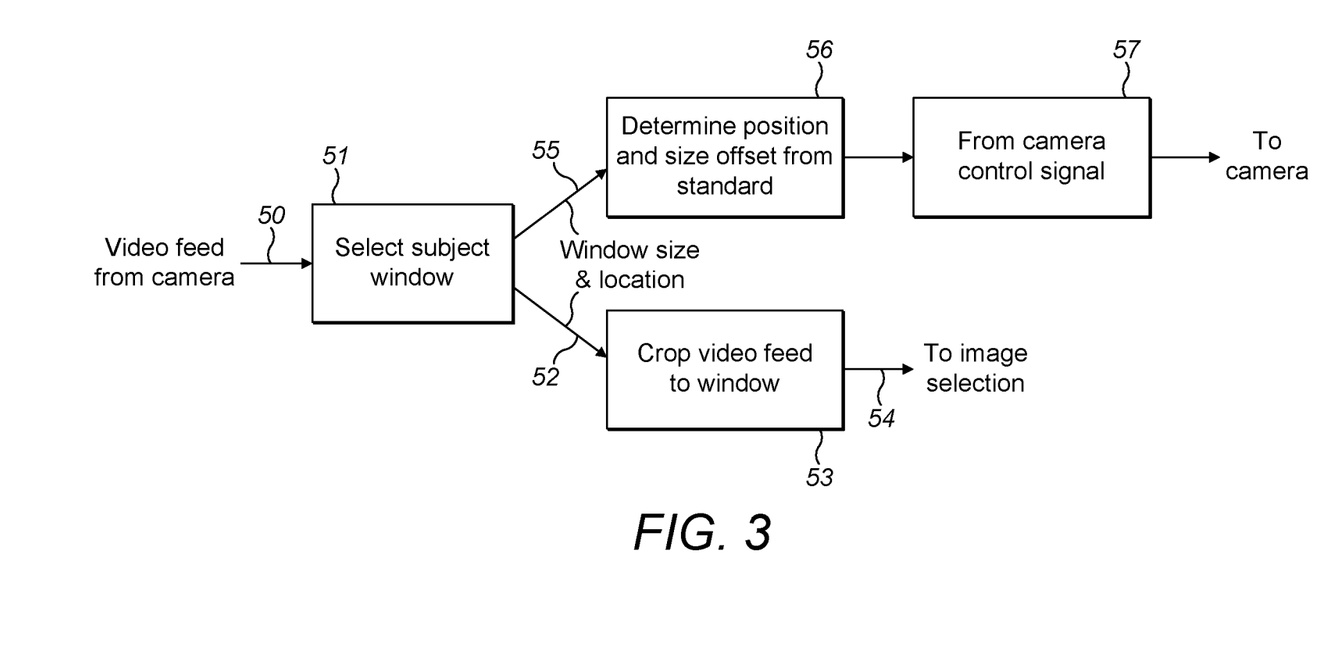
FIG. 3 illustrates a process for manipulating images and providing a camera control signal.

FIG. 3 shows some of the process steps in forming the output image. The video feed from a camera is received at 50 and passed to an image subset selection terminal 21. At the terminal 21 a desired portion of the video stream is selected. (Step 51). This step may be done manually or automatically. The terminal 21 transmits the location and size of the boundary box to the controller 20. (Step 52). The controller crops and/or downscales the selected portion of the camera stream to form an intermediate stream at the intended output resolution. (Step 53). That can then be passed to terminal 22 (step 44) to select a stream for incorporation into the output stream. In practice there may be multiple output streams, showing respective parts of a race, respective participants, respective points of view and so on.

The size and location of the boundary box is an indication of the portion of the camera stream that is most of interest. In the present system, that information is used to cause motion and/or zooming of the camera. This can avoid the need for separate control of the camera, and can have the result that the camera is automatically kept keyed to the portion of interest. It can do this in a manner that mitigates delay between the camera and the location from which it is controlled. The mechanism for this will now be described.

As indicated in FIG. 3, the size and location of the boundary box or window is passed (step 55) as input to a step (56) of determining the deviation of that size and location from a predetermined standard. In dependence on that deviation, control signals for movement (e.g. pan and tilt, or movement of an arm or a camera dolly) and/or zoom are formed. (Step 57). Steps 56 and 57 may be performed at the controller 20. Then those control signals are transmitted to the interface 17, and used to control the motion and/or zoom of the camera. The signals may be sent towards the camera over the same link as is used to send the video from the camera, or over a different link 60. Either link may, independently, pas via or not pass via the network 3. Thus, the movement and/or zoom of the camera are controlled remotely in response to the selection of a portion of the video stream from the camera that is designated for further processing. This can avoid the need to separately select a portion of the captured video stream that is of interest and control the camera. When the camera control signal is generated so as to tend to keep the locations corresponding to the designated region spaced from the edge of the captured video stream, this can mitigate against transmission delays between the camera and the location where the video is analysed, since even in the event of a delay in the movement of the camera, there can be freedom to move or zoom the designated region beyond its current position.

Some examples of how the camera can be controlled in response to movement of the boundary box will now be described.

1. The centre of the boundary box may be determined. If that centre is above a predetermined point in the camera mage frame, conveniently the centre of the camera image, frame then the camera may be signalled to tilt up or to move up. If the boundary box centre is below the centre of the camera image then the camera may be signalled to tilt down or to move down. If the boundary box centre is left of the centre of the camera image then the camera may be signalled to pan left or to move left. If the boundary box centre is right of the centre of the camera image then the camera may be signalled to pan right or to move right. In each case the centre may be the geometric centre, i.e. the point of intersection of the diagonals of the box or image frame. Thus, the camera may be controlled so that its field of view moves to tend to bring the location in the camera's field of view that is at the centre of the boundary box closer to the centre of the camera's field of view. The rate of movement of the camera's field of view may be dependent on the distance of the centre of the boundary box from the centre of the camera's field of view. The rate of movement may be controlled to be faster as that distance increases.

2. A predetermined preferred size for the boundary box may be determined. That may be expressed as a proportion of the size of the camera image frame. The proportion may, for example, be 60%. The proportion is preferably between 80% and 50%. If the proportion is too large then the tolerance for delay in camera control may be too small. If the proportion is too small then the boundary box may from time to time need to be so small that the output image is being upscaled, which can reduce output quality. If the boundary box is larger than the preferred size then the camera may be caused to zoom out. If the boundary box is smaller than the preferred size then the camera may be caused to zoom in. Thus the camera may be controlled so that its field of view scales to tend to bring the size of the boundary box to the predetermined preferred size. The rate of zoom may be dependent on the difference between the boundary box size and the preferred size. The rate of zoom may be controlled to be faster when that difference is greater.

Put another way, a camera captures a video stream at a first resolution. That video stream is transmitted to a control location. The control location may be remote from the camera. As a result, there may be substantial delays for signals (i) conveying video from the camera to the control location and/or (ii) conveying control signals from the control location to the camera. The camera is configured so that its field of view can be adjusted in dependence on signals received from the control location. This may involve one or more of (i) rotating the camera (e.g. in pan or tilt), (ii) adjusting the zoom of the camera and (iii) translating the camera, e.g. on a track, an articulated arm or a drone. At the control location a sub-region of the video stream captured by the camera is designated. That designation may be done manually or automatically. The video stream captured by the camera may be displayed at the control centre contemporaneously with its being received at the control centre on a terminal that comprises a user interface whereby a user of the terminal can designate a region of the displayed video. The user interface may permit the designated region to be (i) moved vertically and/or horizontally with respect to the captured video and/or (ii) changed in size with respect to the full frame size of the captured video. In response to the designation of a region of the video, two operations may be performed.

1. A secondary video stream may be formed by cropping the video stream from the camera to the designated region. That secondary video stream may be output for viewing elsewhere.

2. A control signal may be formed in dependence on the size and/or location of the designated region with respect to the full frame of the video. That control signal is then transmitted to the camera to control it. The control signal is formed such that it will cause the camera's field of view to move in such a way as to bring the subject location that occupies the designated region (i) closer to the centre of the camera's field of view and/or (ii) closer to being of a predetermined size in the camera's field of view.

Together, these steps can permit the camera to be controlled automatically with a reduced perception of lag at the control location compared to a system in which an operator there is not able to select a sub-region of the captured video. They can also permit the camera's field of view to be controlled in a way that makes it easier for an operator to maintain a subject in the camera's field of view.

When the designated region is being designated by an operator, the operator's control station may show the entire field of view of the captured video, and highlight the region designated by the operator. Alternatively it may shows just the region designated by the operator. The second approach can be beneficial in that it can give the operator the sensation that he is controlling the camera with minimal lag. This happens because short-term adjustments made by the operator can be accommodated by adjusting the sub-region of the captured video that is designated, whereas longer-term adjustments can be accommodated by motion of the camera. The system can thus be considered as operating with two feedback loops, one inside the other.

When the camera's field of view moves or changes size, it may be desirable to automatically adjust the designated region in the opposite sense. This can reduce the likelihood of the operator feeling that the system has overreacted to a control input.

With these approaches, the camera can tend to follow a guide given by the location and size of the boundary box, so as to concentrate on the area of the image that is of greatest interest.

The camera control signal may be generated automatically and/or algorithmically by the processor 24. The camera control signal may be generated by a computer configured to generate the signal in accordance with pre-stored instructions to implement an algorithm whereby the signal is formed in dependence on the location and/or size of the boundary box relative to the video stream captured by the camera. The camera control signal may be generated periodically. It may be generated for each frame of the image, or each time the boundary box moves, or at predetermined intervals, e.g. every 5 ms or 10 ms.

The nature of the camera control signal will depend on the interface 17 and the motors or other devices used to control the camera. In respect of each of the camera's pan, tilt, position and/or zoom it may, for example, indicate a target state or a commanded movement.

The responsiveness of the camera may be varied to take account of the signalling delay between the camera 1 and the control station 2. The rate or magnitude of camera adjustment may be varied depending on that signalling delay. This can help to avoid the camera reacting too quickly or slowly to movement or re-sizing of the boundary box. In one example, the control station has access to a measurement of the signalling delay between the camera installation and the control unit 20. This measurement may be made by the control station, or by the camera installation and then signalled to the control unit. The timing measurement may be made by any known measurement technique: for example both ends of the data link could synchronise to a common clock and then the time of signal propagation could be measured with reference to that clock. Once the delay is known, the rate of camera adjustment in response to a given deviation of the box centre or size from a reference point or size may be adjusted in dependence on the delay. For larger delays, the rate of adjustment may be greater. In an alternative approach, a preferred rate of adjustment may be learned automatically by treating an increased frequency of reversals in motion or sizing of the boundary box as indicative of an overshoot in the camera's movement. The frequency of reversal in motion (up to down or left to right) or sizing (increase to decrease or vice versa) of the boundary box may be detected over a period of time, e.g. 10 s or 30 s. When that frequency is greater than a first predetermined value, the responsiveness of the camera may be reduced, e.g. by adapting the control signals to command a lower rate or magnitude of adjustment. When that frequency is less than a second predetermined value (which is less than the first predetermined value), the responsiveness of the camera may be reduced, by adapting the control signals to command a greater rate or magnitude of adjustment. The camera control signals may be formed such that the rate of change of the camera's field of view is dependent on the deviation of the designated region from a predetermined location (typically this would be centred with respect to the captured video stream) and/or size. As the designated region deviates further from that predetermined location and/or size the rate of change is increased. This can help an operator to maintain a subject in the camera's field of view. Thus, the responsiveness of the control mechanism may be tuned automatically to the level of delay over the link. Other control loop mechanisms may be used to tune responsiveness over the link.

The units 20, 21, 22 may be combined together in any suitable fashion or split up into multiple physical devices such as terminals and computer servers.

In the examples given above, the camera is physically moved in response to the selection of a different region in the video stream. In another system, the transmission of relatively high resolution video from a camera may be used to give an operator at a location remote from the camera the sensation that he is in fact moving the camera. The camera captures video at a resolution greater than an intended output resolution. That video is transmitted from the camera to a location remote from the camera. The operator is at that location. The operator is provided with a user interface device that simulates a camera. It may, for example be set on a pan/tilt head. It may have handles or other apparatus of a physical type that is conventionally used to move a camera. One example is a pan bar. It may have a zoom control of the physical type that is conventionally used to zoom a camera, for example a twist grip, slider or rocker on a pan/tilt handle. The user interface device has a video display. It may be a video display which is configured to simulate a type conventionally used as part of a camera to permit an operator to view the image that the camera is capturing. Put another way, the operator is provided with a simulated camera. Sensors are provided for sensing the position of the various user inputs. A processing device, which could be incorporated in the simulated camera or could be a separate unit, selects a portion of the video stream received from the remote camera in dependence on the sensed position of the user inputs, and causes that portion to be displayed on the video screen of the operator's device. That portion may also be passed for further processing, as described in more detail above. The processing device selects the portion in such a way as to give the operator the sensation that he is operating a real camera. Thus, if the direction in which the operator's device is directed moved by a given angle in a given direction, the portion selected is moved as if a remote camera had moved by the same angle in the same direction.

If the zoom control of the operator's device is altered as if to zoom a camera by a certain amount in or out then the portion selected is zoomed in or out by that amount. This gives the user the sensation that he is operating an actual camera. This can make the selection of a portion of video captured by the remote camera a more intuitive operation for a trained camera operator. Optionally the remote camera may be moved in response to the movement of the selected portion in the manner described in more detail above.

Figure 4:
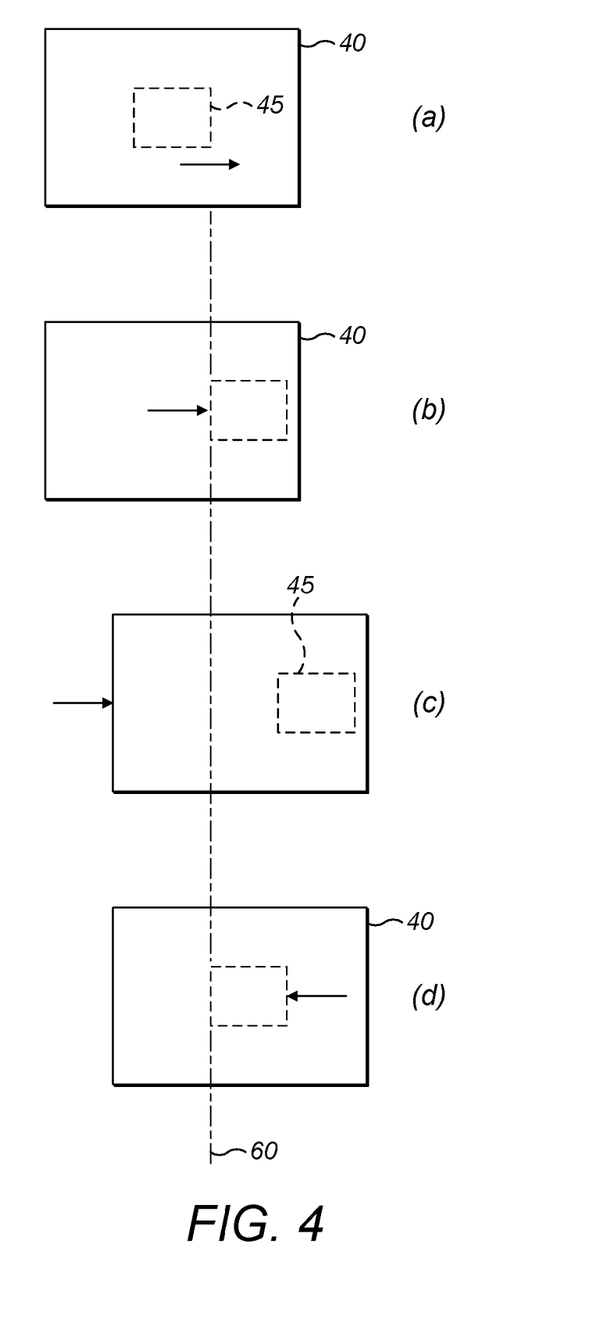
FIG. 4 shows the movement of a designated sub region of an image.

Thus, the system in a preferred example when the comprises three main steps;
(a) an initial identification of the designated sub region of the video stream and in particular a movement of the designated sub region with the higher resolution frame(s) of the video stream
(b) a remote camera move command, which leads to a delayed return of an image due to compression and/or distance travelled by the signal
(c) an inverted and synchronous (with the camera movement) movement of the designated sub region in the higher resolution frame which substantially or completely negates the effects of the delayed camera move This is illustrated in FIG. 4(a) to (d), which shows how a designated sub region 45 can be moved within an image frame on a display 40, which is representative of the video stream from a remote camera. In FIG. 4a, a movement of the designated sub region 45 is initiated. In line with methods described above, this movement can generate a camera control signal to cause the remote camera to move, so as to better align the field of view of the remote camera with the designated sub region, and therefore allow the system greater flexibility in any further movement of the sub region.

FIG. 4b illustrates a moved position for the sub region. The sub region is, as described above, the intended images for broadcast and/or onward transmission. As the sub region moves, a camera control signal can be generated either contemporaneously or after a period of time, but there is a delay before the camera will be able to move. Such camera movement is typically to bring the sub region more closely into the centre of the field of view of the camera.

When the camera does move (as illustrated in FIG. 4c), the sub region is still in the moved position. If the sub region remains in the moved position, then the intended subject matter within field of view of the sub region may no longer be visible. As such, the sub region also needs to move (as shown in FIG. 4d). This move is preferably carried out simultaneously with the camera move, and in an inverse manner. By this, we mean that, if the camera control signal tells the camera to pan to the right, then the sub region must move a corresponding amount to the left, in order that the desired subject matter remains in view within the sub region (as can be seen by dotted line 60). Thus, it is preferable that there is an equal, but opposite, movement applied to the digital camera, i.e. the sub region, when compared to the real camera move.

When the sub region is initially moved, i.e. to indicate a pan of the real camera, the real camera has not yet actually moved. As such, the digital pan of the sub region will not include any distortion, blurring or vignetting that would normally occur when a physical camera moves. Likewise, once the camera is instructed to move, there will be some frames captured by the real camera towards the end of its motion in which the digital pan has ceased, such that blurring, distortion or vignetting should not be present in any transmitted images. In either of these situations, it is preferable that the system adds the relevant blurring, distortion or vignetting effects where they are missing or removes them when they should not be present. In this way, the end viewer sees images which more closely match what would be seen if the images were captured solely using a moving camera without any of the sub region selection.

One preferred process to assist in the addition or removal of the effects is to recognise the delay between the identification of a frame by the sub region and the desired motion of the real camera to compensate for the movement of the sub region. Delay may also be caused by compression issues and/or by the time taken for signals to be transmitted over distance.

The delay could be recognised in various ways, but a preferred method is as follows.

Delay Detection:

(1) It is preferable to synchronise local (i.e. sub region) and remote (real camera) data streams, so remote frame rate and local frame offsets don't drift. This allows the measurement the delay of the system, accurately, without having error introduced by offset. Without this synchronisation, the delay could grow without bound, or reduce until it is not correctable.

GNSS (e.g. GPS) can be used to generate a local and remote frame sync, and generate local and remote time stamps.

2. Then time stamp the local commanded position.
3. At remote location, either:
A. Only local time stamps. Need to be able to inject these into video stream.
   For each video frame:
   1. Read the latest position and time stamp sent by local location.
   2. Command robot to go to latest position. The remote robot will identify the incoming frame, and match it to it's frame, The local data will be delayed as necessary to overcome jitter.
   3. Store local time stamp in current frame of video stream,
   4. Read remote position, and combine with local time stamp to send in position stream to local location.
   5. At local location, read local and remove streams, and combine so the offset of time stamps remains constant.
This offset can be determined automatically, for example by finding the largest offset such that a minimum number of frames are dropped in a given interval. It can also be adjusted manually. Artificial delay may also be added to local and remote streams to allow for computation delays.
With this method, it is possible to embed the remote position data and local time stamp completely within the video stream.
Or B. Use local and remote time stamps. Use a comparison of the remote and local streams to correlate time stamps. With this method, a camera system that generates it's own time stamps can be used.
   For each video frame . . .
   1. Read the latest position and time stamp sent by local location.
   2. Command robot to go to latest position
   3. Store remote time stamp in video stream, and record in software.
   4. Store remote time stamp in current frame of video stream.
   5. Read remote position, and combine with local time stamp and remote time stamp to send in position stream to local location.

6. At local location, read local and remove streams, and combine so the offset of local time time stamps remains constant.

The video stream is synchronised by looking at the remote time stamp, and finding the matching packet that has remote time stamp. This will also have local time stamp, so we can determine delay on video.

This offset can be determined automatically, by finding largest offset such that a minimum number of frames are dropped in a given interval. It can also be adjusted manually. Artificial delay may also be added to local and remote streams to allow for computation delays.

The nature of the time stamps could be for example:

SMPTE Timecode

PTP time stamps.

Computer's clock.

RTP time stamps (RTP is protocol to transfer real-time streams, including video or audio.

Thus, one purpose of the recognition of the delay is to find the round-trip delay from local (processing facility) to remote (real camera), and back to local. Extra delay maybe added where necessary to cope with jitter in the arrival of packets, whether that be local position at remote, remote video at local or remote position at local.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for forming a processed video stream, comprising:
   capturing a first part of an input video stream using a camera;
   transmitting the first part of the video stream to a processing facility remote from the camera;
   at the processing facility, designating a first sub-region of the first part of the video stream for further processing;
   in dependence on the designation of a first sub-region, forming a first cropped video stream by cropping the first part of the video stream to that sub-region;
   forming the processed video stream incorporating the first cropped video stream,
   wherein the camera is automatically adjustable to alter its field of view, and the method comprises, in dependence on the designation of a first sub-region, forming a camera control signal based on the first sub-region with respect to the first part of the video stream and automatically adjusting the field of view of the camera in dependence on the camera control signal.

2. A method as claimed in claim 1, wherein the step of designating the first sub-region is performed contemporaneously with the step of capturing the input video stream.

3. A method as claimed in claim 1, wherein the processed video stream is a live broadcast stream depicting a live event.

4. A method as claimed in claim 1, wherein the step of capturing the input video stream comprises capturing a video stream of a live event.

5. A method as claimed in claim 1, comprising, after the step of adjusting the field of view of the camera:
   capturing a second part of the input video stream using the camera;
   transmitting the second part of the input video stream to the processing facility;
   at the processing facility, designating a second sub-region of the second part of the input video stream for further processing;
   in dependence on the designation of a second sub-region:
      (i) forming a second cropped video stream by cropping the second part of the video stream to that sub-region; and
   forming the processed video stream incorporating the second cropped video stream.

6. A method as claimed in claim 1, comprising:
   transmitting the camera control signal to a camera installation comprising the camera;
   the camera installation being configured to automatically adjust the field of view of the camera in dependence on the camera control signal.

7. A method as claimed in claim 1, wherein the step of forming the camera control signal comprises automatically analyzing the position and/or size of the first sub-region with respect to the entire field of the first part of the input video stream, and automatically applying a predetermined algorithm in dependence on that determination to form the camera control signal.

8. A method as claimed in claim 1, wherein the camera control signal is such as to cause the field of view of the camera to alter so as either (i) to bring a location in the first part of the input video stream at the center of the first sub-region closer to the center of the field of view of the camera or (ii) to bring a region in the first part of the input video stream of the size of the first sub-region closer in size to a predetermined target size.

9. A method according to claim 8, further comprising the step of adjusting, in an inverse manner to the camera control signal, the position of the first sub-region within the field of view of the camera, such that the field of view within the first sub-region remains the same.

10. A method according to claim 8, further comprising the step of recognizing a delay between the designation of the first sub region and the movement of the camera in response to the camera control signal.

11. A method according to claim 10, wherein the inverse adjusting of the position of the first sub-region within the video stream is dependent upon the recognized delay.

12. A method according to claim 11, further comprising the step of adjusting the display at the processing facility of images from the camera, based on the recognized delay, such that the first sub region moves closer to the center of the video stream.

13. A method according to claim 8, further comprising the step of recognizing a delay between the designation of the first sub region and the receipt of images generated after movement of the camera in response to the camera control signal.

14. A method according to claim 8, further comprising the step of identifying when individual image frames were captured so as to permit the determination of whether a given frame was captured whilst the camera was in motion or stationary.

15. A method according to claim 14, further comprising the step of introducing motion blur into one or more frames in the first cropped video stream that were captured whilst the remote camera was stationary, but after a camera movement control signal had been generated.

16. A method according to claim 14, further comprising the step of removing image motion blur from one or more frames in the first cropped video stream that were captured whilst the remote camera was moving, but after the camera control signal had indicated the camera should be stationary.

17. A method according to claim 8, further comprising the step of compensating for distortion and/or vignetting caused by the center of the first sub region not being aligned with the center of the field of view of the camera.

18. A method as claimed claim 1, comprising:
   estimating the responsiveness of the camera to a previous camera control signal; and
   forming the camera control signal in dependence on that estimated responsiveness.

19. A method as claimed in claim 1, wherein the step of designating a first sub-region of the first part of the video stream for further processing is performed either by a human designating the first sub-region, and the method comprises displaying the boundary of the first sub-region to the user on a display, or by automatically analyzing the first part of the video stream to identify a subject of interest therein, and designating the first sub-region so as to encompass that subject.

* * * * *